United States Patent
Slater et al.

(10) Patent No.: US 10,753,805 B2
(45) Date of Patent: Aug. 25, 2020

(54) RADIATION SHIELD FOR NEAR-INFRARED DETECTORS

(71) Applicant: Kaiser Optical Systems Inc., Ann Arbor, MI (US)

(72) Inventors: Joseph B. Slater, Dexter, MI (US);
James M. Tedesco, Livonia, MI (US);
Alfred Feitisch, Ranch Cucamonga, CA (US)

(73) Assignee: Kaiser Optical Systems Inc., Ann Arbor, MI (US)

( * ) Notice: Subject to any disclaimer, the term of this patent is extended or adjusted under 35 U.S.C. 154(b) by 0 days.

(21) Appl. No.: 15/479,681

(22) Filed: Apr. 5, 2017

(65) Prior Publication Data

US 2018/0292266 A1    Oct. 11, 2018

(51) Int. Cl.
| | |
|---|---|
| *G01J 5/06* | (2006.01) |
| *G01N 21/65* | (2006.01) |
| *G01J 3/44* | (2006.01) |
| *G01J 5/04* | (2006.01) |

(52) U.S. Cl.
CPC ............... *G01J 5/061* (2013.01); *G01J 3/44* (2013.01); *G01J 3/4406* (2013.01); *G01J 5/046* (2013.01); *G01N 21/65* (2013.01); *G01J 2005/065* (2013.01)

(58) Field of Classification Search
CPC .... G01J 5/061; G01J 3/4406; G01J 2005/065; G01N 21/65
See application file for complete search history.

(56) References Cited

U.S. PATENT DOCUMENTS

| | | | |
|---|---|---|---|
| 3,103,585 A | 9/1963 | Johnson et al. | |
| 4,555,626 A * | 11/1985 | Suzuki | H05K 9/00 |
| | | | 250/239 |
| 4,862,002 A * | 8/1989 | Wang | G01J 5/28 |
| | | | 250/332 |
| 4,990,782 A | 2/1991 | Wellman et al. | |
| 5,041,723 A * | 8/1991 | Ishida | G01N 21/3504 |
| | | | 250/339.01 |
| 5,089,705 A | 2/1992 | Ueda et al. | |
| 5,371,369 A * | 12/1994 | Kent | G01J 5/061 |
| | | | 250/332 |
| 5,393,931 A | 2/1995 | Guenther | |
| 5,434,413 A * | 7/1995 | Kennedy | G01J 5/06 |
| | | | 250/352 |

(Continued)

FOREIGN PATENT DOCUMENTS

CN          104541153 A    4/2015

*Primary Examiner* — Marcus H Taningco
(74) *Attorney, Agent, or Firm* — Christopher R. Powers; Endress+Hauser (USA) Holding Inc.

(57) ABSTRACT

A radiation shield for near-infrared detectors of the type used in Raman spectroscopic systems comprises a chamber enclosing the detector and a cooling device in thermal contact with the chamber and the detector to reduce the level of unwanted radiation to which the detector would otherwise be exposed. The chamber may include a window in optical alignment with the detector, and the window may include one or more coatings to pass wavelengths in a range of interest or block radiation at wavelengths outside of this range. The shield may be enclosed in an evacuated dewar having a window which may also include one or more coatings to favor the wavelength range.

21 Claims, 4 Drawing Sheets

(56) References Cited

U.S. PATENT DOCUMENTS

| | | | | |
|---|---|---|---|---|
| 5,804,827 A | * | 9/1998 | Akagawa | H01L 27/14623 |
| | | | | 250/338.4 |
| 7,770,402 B2 | | 8/2010 | Quarre | |
| 8,964,021 B2 | | 2/2015 | Barringer | |
| 9,450,118 B2 | * | 9/2016 | Widzgowski | H01J 40/02 |
| 2004/0169771 A1 | | 9/2004 | Washington et al. | |
| 2009/0321645 A1 | * | 12/2009 | Hinnrichs | G01J 5/061 |
| | | | | 250/338.5 |
| 2010/0020320 A1 | * | 1/2010 | Yao | G01J 3/2803 |
| | | | | 356/319 |
| 2012/0092663 A1 | * | 4/2012 | Kull | G01N 21/65 |
| | | | | 356/301 |
| 2012/0199929 A1 | | 8/2012 | Kamijyo et al. | |
| 2015/0335248 A1 | * | 11/2015 | Huang | G01N 21/65 |
| | | | | 600/476 |

\* cited by examiner

RADIATION SHIELD FOR NEAR-INFRARED DETECTORS

TECHNICAL FIELD

The present disclosure generally relates to spectroscopy and, in particular, to a radiation shield for detectors operating in the near-infrared.

BACKGROUND

Certain Raman systems operate with pump wavelengths in the near-infrared (NIR) range (typically wavelengths of 0.7 to 2.5 microns). Such systems have an advantage in certain application spaces in that they reduce the amount of fluorescence signal contamination. A disadvantage, however, is that this wavelength range contains significant and detectable amounts of blackbody radiation which manifests itself as background noise, which can reduce the sensitivity, specificity and accuracy of the Raman measurement. This background is generated from the "scene," including the surfaces of the instrumentation facing the detector. Typically such surfaces include the inside walls of the detector housing, the window of the detector housing, and any spectrograph surface and components in line of sight to the detector surface.

In typical Raman spectroscopy applications, such as astronomy, industrial process control, pharmaceutical and or bio-pharma composition, process and quality control and the like, the detector can be cooled to well below ambient temperatures, typically using a thermoelectric (TE) stack. While this minimizes dark noise generated within the detector itself, it does not solve problems associated with the undesirable radiation incident upon the detector. Accordingly, there remains a need for further contributions in this area of technology.

SUMMARY

According to at least one aspect of the present disclosure, a radiation shield for a near-infrared (NIR) detector includes: a chamber including an NIR detector and an aperture, the chamber composed of a thermally conductive material, the detector disposed within the chamber and opposite the aperture, and the shield further including a cooling device in thermal contact with the chamber and structured to lower the temperature of the chamber to reduce the emission from the chamber of unwanted radiation incident upon the detector, wherein the aperture is configured to enable the detector to receive electromagnetic signals in a desired operational wavelength range of interest from a spectrograph. The desired operational wavelength range may be 0.4 to 2.5 microns, and the electromagnetic signals are Raman signals. In certain embodiments, the radiation shield further comprises a window covering the aperture in the chamber. In further embodiments, the window includes one or more coatings capable of selectively passing the operational wavelength range and/or blocking radiation at wavelengths outside the operational wavelength range.

In at least one embodiment, the chamber is disposed within an evacuated dewar including a dewar window optically aligned with the aperture and the detector, wherein the dewar window includes one or more coatings capable of selectively passing the operational wavelength range and/or blocking radiation at wavelengths outside the operational wavelength range. In certain embodiments, the chamber has an inside surface with a relatively low emissivity in the infrared range. In further embodiments, the chamber has an outside surface with a relatively high reflectivity in the infrared range.

According to another aspect of the present disclosure, a Raman spectroscopic system includes: a spectrograph outputting Raman spectra in a near-infrared (NIR) optical range; a detector configured to receive the spectra and output electrical signals representative of the spectra with an operational wavelength range, wherein the detector is disposed in a radiation shield, the shield including a chamber composed of a thermally conductive material and including an opening in opposing relation to the detector enabling the detector to receive the Raman spectra from the spectrograph through the opening; and a cooling device in contact with the chamber to lower the temperature of the chamber and reduce the level of unwanted radiation to which the detector would otherwise be exposed.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
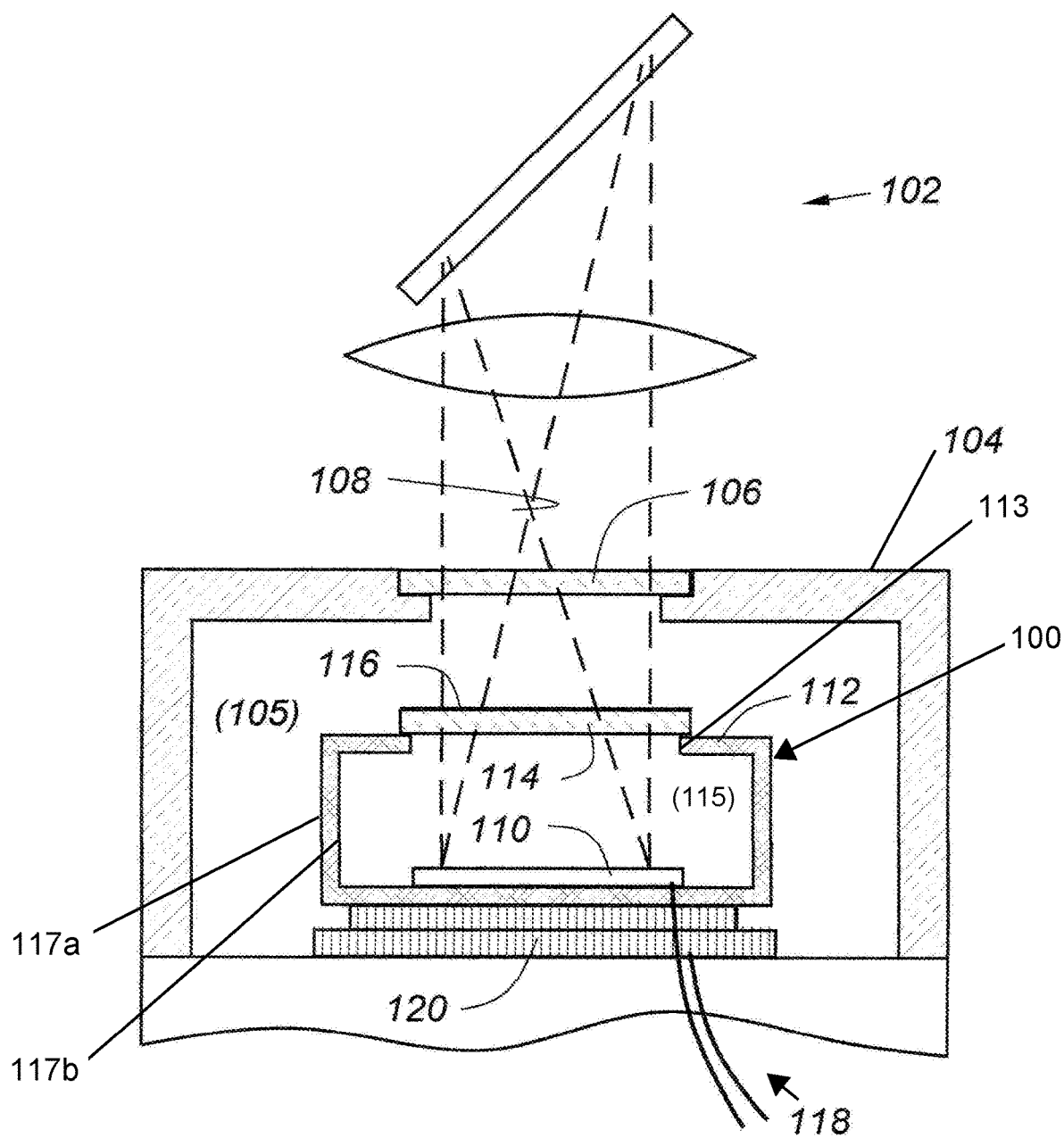
FIG. 1 shows a cross-sectional view of an exemplary embodiment according to the present disclosure, including a thermoelectric cooling device.

The present application discloses various embodiments of a radiation shield for near-infrared (NIR) detectors. Embodiments according to the present disclosure reduce the exposure of NIR detectors to unwanted radiation by surrounding the detector with the disclosed radiation shields. According to one aspect of the present disclosure, the shield includes a chamber enclosing the detector, which is disposed opposite an opening in the chamber enabling the detector to receive Raman signals in a desired NIR wavelength range from a spectrograph. According to a further aspect of the present disclosure, the chamber may include a cooling device, such as a thermoelectric stack and/or a cyclic compression-expansion cooler, to lower the temperature of the chamber to reduce the level of background noise generated in the detector. Ideally, all surfaces to which the detector is exposed would have as low a temperature as possible, with the desired emissivity properties, to minimize the amount of unwanted radiation getting to the detector. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. In particular, though the present disclosure is described with respect to Raman spectroscopic systems, the disclosed radiation shields may be applied to detectors other than NIR detectors used in Raman spectroscopic systems.

FIG. 1 illustrates a radiation shield 100 according to an embodiment of the present disclosure. As shown in FIG. 1, the shield 100 includes a chamber 112 defining a shield volume 115 and having an aperture 113. In certain embodiments, the shield 100 may be disposed within a vacuum-sealed case or dewar 104, which receives electromagnetic spectra 108 from a spectrometer 102. In at least one embodiment, the electromagnetic spectra 108 may be Raman spectra from a Raman spectrometer. The dewar 104 includes a dewar window 106 which is sealed to the environment to define an evacuated volume 105, in which the shield 100 is disposed.

The shield 100 may include a detector 110 disposed within the shield volume 115 opposite the aperture 113 such that the electromagnetic spectra 108 transmitted through the dewar window 106 and the aperture 113 falls incident upon the detector 110, as shown in FIG. 1. The aperture 113 is sized relative to its distance from detector 110 to enable only those steradians necessary to transmit the desired spectra 108 to see the detector 110, and the chamber 112 is proportioned to cover or block all the steradians not necessary to transmit the desired spectra 108.

The detector 110 may be any type of detector suitable for the desired application of the shield 100. For example, the detector 110 may be at least one of an InGaAs (Indium-Gallium-Arsenide), InAs (Indium-Arsenide), Si (Silicon), Ge (Germanium), SiGe (Silicon-Germanium), PbS (Lead-Sulfide), PbSe (Lead-Selenide), or MCT (Mercury-Cadmium-Telluride) detector and the like. The detector 110 may be configured as an array having at least one detecting element, specifically, the detector 110 may be structured as a single element or a multi-element detector. In a single element embodiment, for example, a Raman spectrum may be scanned over a single element detector, particularly for a narrow band for an analyte-specific application.

The at least one detector element can be one of a CCD (charge coupled device), a CMOS (complementary metal oxide semiconductor), a photodiode with a p-n junction, a PIN photodiode with an intrinsic semiconductor material between the p and n semiconductors and the like. In at least one application of the present disclosure, the detector 110 may be a line or 2D array type InGaAs detector, such as a 1024 pixel linear InGaAs photodiode array as manufactured by Sensors Unlimited (Part No. SU1024LE-1.7). The detector 110 may have a desired operational wavelength range that at least includes the range of the electromagnetic spectra 108 and the spectrometer 102. In certain embodiments, the desired operational wavelength range of the detector 110 may be around 0.4 to 2.5 microns. In alternative embodiments, the desired operational wavelength range of the detector 110 may be approximately 0.9 to 1.4 microns or approximately 1.0 to 1.31 microns.

In at least one embodiment, the chamber 112 is thermally conductive and, accordingly, is made of a material having a relatively high thermal conductivity—for instance, greater than 100 Watts per meter-Kelvin (W/m·K). In certain embodiments, the chamber 112 is made of a material having a thermal conductivity greater than about 250 W/m·K. The chamber 112 may be at least partially composed of a thermally conductive metal, metal alloy, non-metal, ceramic, glass, mono-crystalline material, poly-crystalline material and/or composite material. For example, the chamber may include a metal, such as copper or aluminum, or a metal alloy, such as oxygen-free high thermal conductivity (OFHC) copper, copper-tungsten (CuW) or other suitably thermally conductive metal or alloy. The chamber 112 may include a thermally conductive ceramic such as beryllium oxide (BeO), aluminum nitride (AlN), silicon nitride ($Si_3N_4$), carbides such as silicon carbide (SiC), complex borides or other suitable ceramic. In further embodiments, the chamber 112 may include a thermally conductive composite material such as a diamond/metal composite. Exemplary suitable metal/diamond composites include copper/diamond, aluminum/diamond, silver/diamond and diamond/copper-titanium. In such embodiments, the diamond/metal composites may be fabricated by a sintering process to improve wettability between the diamond and the metal matrix. In certain embodiments, the chamber 112 may be a material having a thermal conductivity as low as 10 W/m·K, 20 W/m·K or 30 W/m·K. Exemplary materials in this range of thermal conductivities include nickel-iron alloy (i.e., Invar), nickel-cobalt ferrous alloy (i.e., Kovar) and lead. In further embodiments, the material of the chamber 112 may have a thermal conductivity of 40, 50, 60, 70, 80, 90 or 100 W/m·K.

In at least one embodiment, the chamber 112 may be composed at least partially of an allotrope of carbon, such as diamond. In such an embodiment, at least a wall of the chamber 112 having a thickness may be structured to attenuate or prevent re-reflection of the Raman spectra within the chamber 112 and/or absorption of thermal radiation from outside the chamber 112. For example, the wall of the chamber 112 may transition along its thickness from a monocrystalline or polycrystalline diamond at an exterior surface of the wall to an array of columns or spires at an interior surface of the wall, where the columns or spires are proportioned and distributed to increase absorption and reduce reflectivity of radiation through the infrared range. Alternatively, the chamber 112 may include nanotubes of carbon at the interior surface whose proportions and distribution maximize absorption of radiation in the infrared range. In such embodiments, the surface structure of the chamber 112 may include features of less than a wavelength in a predetermined infrared range.

Generally, the infrared range includes near-infrared (NIR), mid-infrared and far-infrared wavelengths of approximately 0.7 to 1000 microns collectively. Thermal radiation for objects at temperatures above approximately −60° C. (i.e., the temperature of a cooled InGaAs detector array) peaks in the wavelength range of approximately 13 microns and below. The aggregate radiation impinging on a detector at wavelengths within its sensitivity range may affect its performance. Higher temperature surfaces emit correspondingly higher absolute spectral radiation in all wavelength ranges, even though the peak radiation wavelength shifts to shorter wavelengths with increasing temperature. Accordingly, it may be desirable to reduce both the temperature and emissivity of surfaces in view of a detector to reduce thermal background noise.

In at least one embodiment according to the present disclosure, the chamber 112 may include a material having a relatively low emission coefficient (i.e., low emissivity) in at least the infrared range. In operation, the chamber 112 may have a temperature between that of the detector 110 and the surrounding hardware, including the spectrometer 102, from which the chamber 112 partially shields the detector 110. At a certain temperature, thermal radiation emitted or reflected from the chamber 112 is sufficiently low so as to not significantly elevate the inherent detector dark current generated by the cooler detector 110. In such an embodiment, at least the interior surface of the chamber 112 may have a low emissivity to limit the cooling of the chamber 112 necessary to reach a condition at which the contribution of the chamber 112 to the background radiation incident upon the detector 110 is negligible. In such an embodiment, at least the interior surface of the chamber 112 may be a material having an emissivity less than about 0.30. The chamber 112 may further include a material having a relatively high spectral reflectivity, which may be associated with a low emissivity to reduce the absorption of external radiation by the chamber 112. Further, the interior surfaces of the chamber 112 may be a material having a relatively high absorptivity in the operational NIR range to reduce internal reflections that may fall incident upon the detector 110. In certain embodiments, at least the exterior surface of the chamber 112 may have a relatively high spectral reflectivity in the infrared range to attenuate the absorption of external radiation.

In at least one embodiment, the chamber 112 may include multiple layers or a composite of multiple materials described herein to attenuate absorption of external radiation, reduce emission from the interior surface of the chamber 112, and facilitate thermal conduction from the chamber 112. In all embodiments, relatively high absorptivity may include absorptivities greater than 0.5, 0.7 or 0.9; relatively high spectral reflectivity may include reflectivities greater than 0.5, 0.7 or 0.9; and relatively low emissivity may include emissivities less than 0.1, 0.3 or 0.5.

The chamber 112 may include an exterior treatment 117a applied on exterior surfaces of the chamber 112 and having a relatively low emissivity or having a relatively high spectral reflectivity to minimize the absorption of external radiation. As examples, the exterior treatment 117a may include a low emissivity coating, such as a coating including alumina (i.e., aluminum oxide ($Al_2O_3$) or emissivity-reducing nanoparticles. Alternatively, the exterior treatment 117a may include polishing the exterior surfaces of the chamber 112 to lower the surface emissivity of the chamber material and produce a relatively low emissivity surface as described herein. In an exemplary embodiment, the chamber 112 may be aluminum or copper with a highly polished exterior surface, yielding in an emissivity less than 0.1. In at least one embodiment, the exterior treatment 117a may be spectrally reflective to reduce the absorption of external radiation by the chamber 112. The chamber 112, with or without the exterior treatment 117a, may reflect radiation in at least a portion of the infrared wavelength range, as defined herein.

In certain embodiments, the chamber 112 may further include an interior treatment 117b applied on interior surfaces of the chamber 112. The interior treatment 117b may have a relatively low emissivity including, for example, a low emissivity coating and/or a polishing the interior surfaces, similar to treatments described herein with respect to the exterior treatment 117a. Alternatively, the interior treatment 117b may have a relatively high absorptivity in the operational NIR range to reduce the reflectance of interior surfaces of the chamber 112 in view of the detector 110 and to reduce internal reflections that may fall incident upon the detector 110. For example, the interior treatment 117b may have an absorptivity greater than about 0.50, 0.70 or 0.90. The interior treatment 117b may include black anodize, specific flat (i.e., matte) black paints or any suitable high absorptivity coating. In certain embodiments, the interior treatment 117b may include a high absorptivity foil applied to the chamber 112, such as those manufactured by Acktar Ltd. and ACM Coatings GmbH, in which a high absorptivity coating is applied to a foil or other substrate that is subsequently applied to the chamber 112 to form the interior treatment 117b. In certain embodiments, the interior treatment 117b and the exterior treatment 117a may be the same treatment.

In at least one embodiment, the shield 100 may include a shield window 114. In at least one embodiment, the shield window 114 is highly thermally conductive and, accordingly, is made of a material having a relatively high thermal conductivity—for instance, greater than 100 W/m·K—and being highly transparent to the operational NIR range of the spectrometer 102 and the detector 110. In such an embodiment, the shield window 114 may be composed of glass (i.e., amorphous glass), glass-ceramic (i.e., at least partially crystalline glass), diamond, crystalline quartz, silicon, germanium, gallium nitride (GaN) crystals, AlN crystals, optical metamaterial, transparent ceramic such as sapphire (i.e., single-crystal aluminum oxide), magnesium aluminate spinel ($MgAl_2O_4$), aluminum oxynitride spinel ($Al_{23}O_{27}N_5$, often referred to as AlON), or other suitably transparent and thermally conductive material, and combinations of these materials.

Sapphire, crystalline quartz, silicon, germanium, GaN crystals, AlN crystals and optical metamaterials generally have higher thermal conductivity than many common glasses, and most ceramics, and generally have excellent optical transmissivity to infrared, which may attenuate generating thermal radiation from the window 114 itself. Moreover, certain semiconductor materials, such as those mentioned, enable optical transmission properties to be modified via to doping, structural processing, growth conditions and other means. Further, these semiconductor materials may facilitate blocking visible fundamental radiation, which becomes absorbed. In such an embodiment, the window 114 may have an inside optical coating or surface modification that reflects at least nearly all of the unwanted long wavelength thermal radiation.

In at least one embodiment, the shield window 114 may include one or more coatings 116 formulated, structured and applied to pass wavelengths within the desired operational NIR range and/or to block other, undesired wavelengths. The coating 116 may further be polarized to limit external radiation incident upon the interior surfaces of the chamber 112 and the detector 110. The coating 116 may be any operably appropriate coating or filter technology such as dielectric, anti-reflective, dichroic or rugate coatings and filters. The coating 116 may be selected to enable a coating operational wavelength range, including at least the desired operational NIR range of the detector 110 and the spectrometer 102. For example, the coating 116 may have a coating operational wavelength range of about 0.4 to 2.5 microns or 1.0 to 1.31 microns. In certain embodiments, the coating 116 may further include a short pass filter or bandpass filter coating to block radiation at wavelengths above or outside the desired operational wavelength range. As one example, the coating operational wavelength range may by the range applicable to Raman spectroscopy, and most unwanted thermal radiation will be at wavelengths above the Raman range. The coating 116 enables the window 114 to block or at least attenuate a significant amount of the unwanted radiation from the surrounding hardware and scene, radiation that is responsible for transmitting heat and hence background noise to the detector 110. In at least one embodiment, the coating 116 may include a layer that at least partial reflects, absorbs and/or scatters radiation, or a combination thereof, in a specified range.

In at least one embodiment according to the present disclosure, the shield 100 may include a cooling device 120, as shown in FIG. 1. The cooling device 120 enables the chamber 112 to be cooled to an appropriate operational temperature for the detector 110 (i.e., a desired detector temperature). In embodiments including the shield window 114, the cooling device 120 enables cooling of the shield window 114 and the chamber 112. In certain embodiments, the cooling device 120 may be a solid-state cooler. In such embodiments, the cooling device 120 may be a semiconductor thermoelectric (TE) device (i.e., a Peltier device), such as a thermoelectric cooler (TEC), structured to transfer heat from one side of the device to the other across an n-p junction, upon application of a voltage potential, depending on the direction of the current. Certain such devices are designed to operate most efficiently as either a cooler or a heater. Nonetheless, the cooling device 120 may be a thermoelectric heat pump that can be used as a temperature controller that either heats or cools.

In at least one embodiment, the cooling device 120 may be a cyclic compression-expansion cooler. For example, the cooling device 120 may be a closed-cycle, Stirling heat pump having a regenerator to facilitate heat transfer from the shield 100. One such device has been manufactured by Micro-Star International Co., Ltd of Taiwan. Alternatively, the cooling device 120 may be a closed-cycle, Carnot heat pump using a reverse Carnot cycle to facilitate heat transfer from the shield 100. In further embodiments, the cooling device 120 may be a cryogenic cooler (i.e., a cryocooler) using a liquefied gas in thermal communication with the chamber 112. In such an embodiment, the liquefied gas may include, but not be limited to, one or more of nitrogen, carbon dioxide, methane, ethane, oxygen, hydrogen and the like.

The cooling device 120 may be configured to generate a minimum heat pumping capacity to cool the shield 100 to a desired shield temperature and to maintain the detector 110 at a desired detector temperature. The cooling device 120 may have a heat pumping capacity capable of a cooling range of around −20° C. to −120° C. In certain applications, such as applications for Raman spectroscopy, the cooling range may extend at least to −60° C. In at least one embodiment, the cooling device 120 may be a multi-stage cooling device having two or more stages and capable of greater heat pumping capacity than a single-stage cooler. For example, the cooling device 120 may have a first stage capable of generating a first temperature delta across the first stage to yield a first cooling temperature, and a second stage capable of generating a second temperature delta across the second stage to yield a second cooling temperature, where the second cooling temperature is lower than the first cooling temperature. Further, the cooling device 120 may have additional stages, each capable of generating an additional temperature delta to yield ever lower cooling temperatures, thereby increasing the total cooling capacity of the cooling device 120.

The shield 100 may further include a thermal interface material having relatively high thermal conductivity disposed between the chamber 112 and the cooling device 120 to improve thermal contact, reduce thermal resistance and facilitate heat transfer therebetween. The thermal interface material may be a thermal fluid, a thermal grease or paste, a resilient thermal conductor, or solder applied in a molten state. In embodiments incorporating thermal fluid, thermal grease or solder, the material may be applied on at least the mating surfaces. In embodiments incorporating a resilient thermal conductor, such as a metal or metal oxide filled elastomer, the material may be placed between the mating surfaces and held in place by assembly.

The chamber 112 and the cooling device 120 may include feedthroughs 118 to transmit power to and/or signals from detector 110 and to enable control of the cooling device 120. Such feedthroughs 118 may be routed through a bottom portion of the dewar 104, as shown in FIG. 1.

Figure 2:
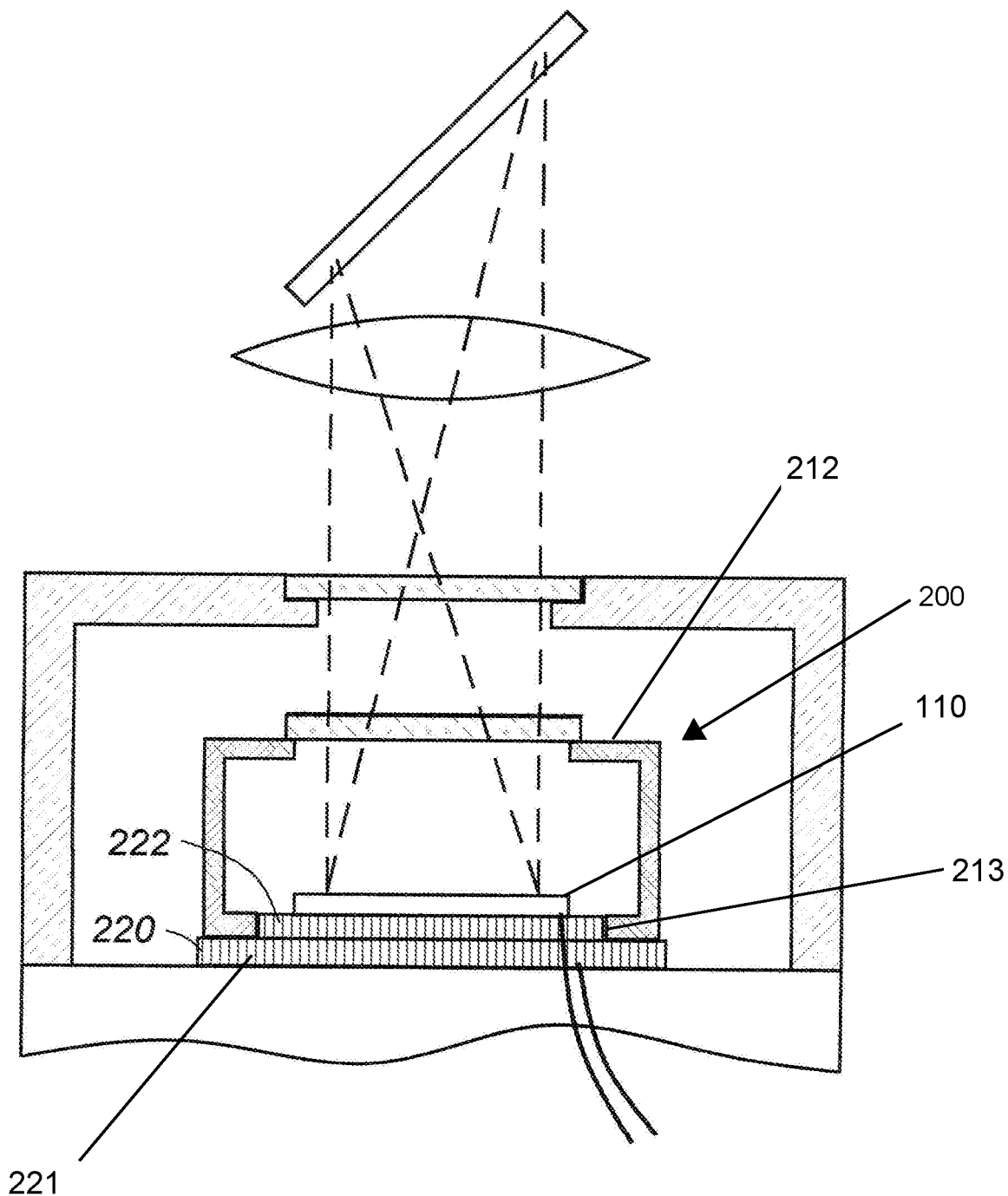
FIG. 2 shows a cross-sectional view of further embodiment according to the present disclosure, including a multi-stage thermoelectric cooling device.

FIG. 2 illustrates a radiation shield 200 according to a further embodiment of the present disclosure. As shown in FIG. 2, the shield 200 may include a multi-stage cooling device 220 having a first stage 221 and a second stage 222. The shield 200 may include a chamber 212 having a bottom opening 213 in a wall adjacent the cooling device 220. The opening 213 may be configured to enable at least a portion of the cooling device 220, for example, the second stage 222, to protrude at least partially through the chamber 212. The opening 213 enables contact and direct thermal communication between the chamber 212 and a desired stage of the multi-stage cooling device 220. In FIG. 2, the chamber 212 is in direct thermal communication with the first stage 221. In such an embodiment, the cooling device 220 may cool the chamber 212 to an intermediate temperature below the ambient or surroundings temperature, driven substantially by the first stage 221, and the cooling device 220 may further cool the detector 110 to a target temperature that is lower than the intermediate temperature, driven substantially by the second stage 222. In certain embodiments, the first stage 221 may be an intermediate stage and the second stage 222 may be a final stage of a multi-stage TE stack having more than two stages.

The chamber 212 with the opening 213 provides an efficient and effective thermal interface to the first stage 221 of the multi-stage cooling device 220, which enables the shield 200 to operate at a desired intermediate temperature that is in between the external, ambient temperature and that of the desired operating temperature of the detector 110. In doing so, the thermal load on the second stage 222 is reduced, enabling more efficient operation of the cooling device 220 and/or lower operating temperature of the detector 110. With the multi-stage cooling device 220, there may be a point of diminishing returns at some intermediate shield temperature, below which thermal radiation from shield 200 is no longer significant with respect to the inherent dark current of the colder detector 110. In at least one embodiment, the cooling device 220 may be a multi-stage thermoelectric cooler (i.e., a TEC stack) having two or more stages and capable of greater heat pumping capacity than a single-stage thermoelectric cooler. Exemplary TECs are manufactured by Marlow Industries, Inc. and TE Technology, Inc., among others.

Referring to FIG. 1, in certain embodiments of the present disclosure, the dewar window 106, shield window 116, and detector 110 may be in relatively close proximity. In such embodiments, improvements in attenuating unwanted incident radiation, which are facilitated by the separate shield window 114 with the coating 116, may be limited because of the larger solid angle over which the coating 116 (e.g., a dielectric filter coating) on the shield window 114 must operate to effectively prevent external radiation from reaching the detector 110. In such embodiments, the aperture 113 may be left open (i.e., the shield window 114 may be omitted), leaving no optical material (either a shield window or a shield window coating) between the detector 110 and the dewar window 106.

Figure 3:
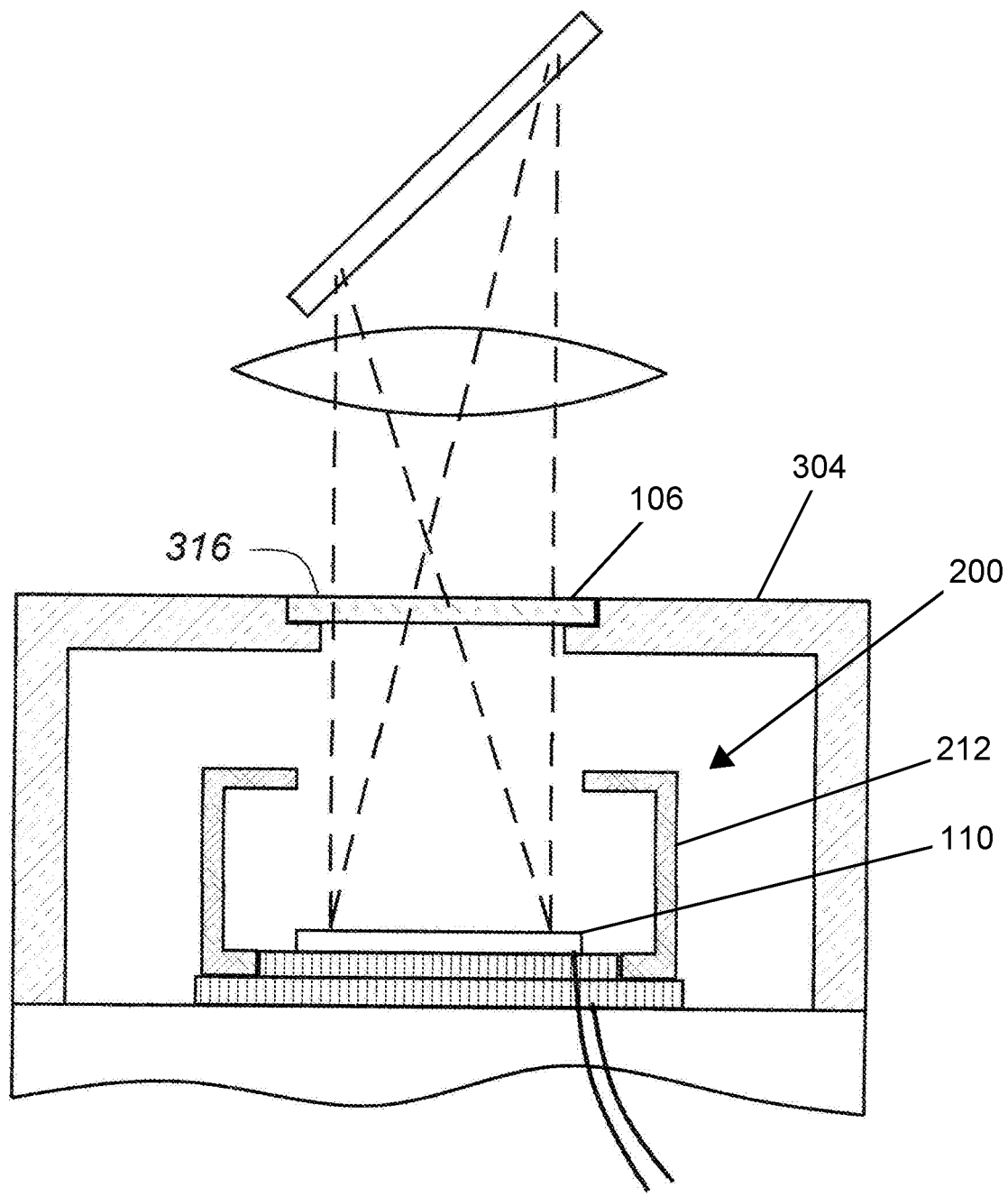
FIG. 3 shows a cross-sectional view of an alternative embodiment according to the present disclosure.

FIG. 3 illustrates a dewar 304 surrounding the shield 200 according to a further embodiment of the present disclosure. As shown in FIG. 3, the shield 200 need not include a shield window. In such embodiments, the dewar 304 may include a dewar window 306 having a coating 316. The dewar window 306 with the coating 316 attenuates unwanted incident radiation that may be difficult to filter where the dewar window 306, chamber 212, and detector 110 are in relatively close proximity.

The coating 316 may be the same or substantially the same as the coating 116, depending on the composition of the dewar window 306. Accordingly, the coating 316 may have a coating operational wavelength range of about 0.4 to 2.5 microns. In certain embodiments, the coating 316 may further include a short pass filter or bandpass filter coating to block radiation at wavelengths above or outside the desired operational wavelength range. As one example, the coating operational wavelength range may by the range applicable to Raman spectroscopy, and most unwanted thermal radiation will be at wavelengths above the Raman range. The coating 316 enables the dewar window 306 to block or at least attenuate a significant amount of the unwanted radiation from the surrounding hardware and scene, radiation that is responsible for transmitting heat and hence background noise to the detector 110.

Figure 4:
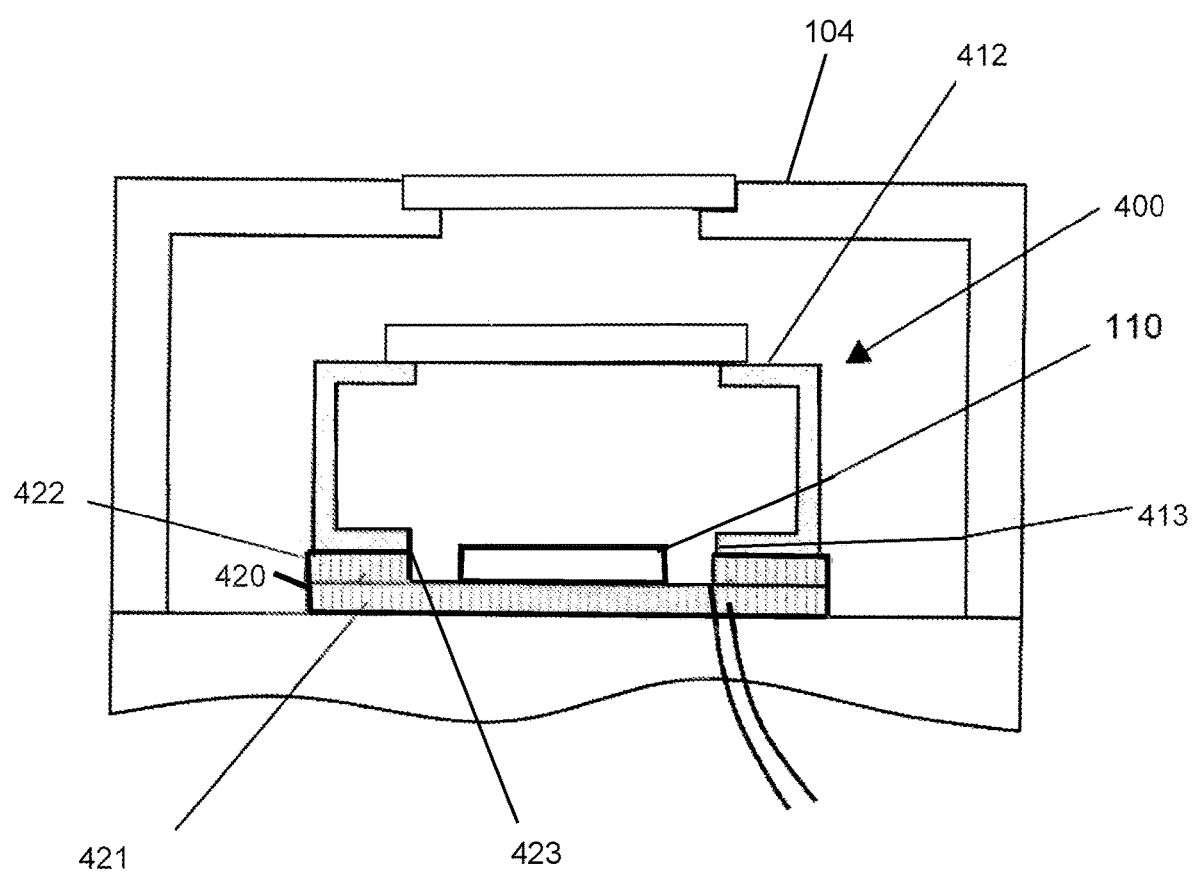
FIG. 4 shows a cross-sectional view of a further embodiment according to the present disclosure.

In a further embodiment according to the present disclosure, a radiation shield 400 is shown in FIG. 4. In FIG. 4, the shield 400 is shown disposed within the dewar 104, and the spectrometer 102 is not shown. The shield 400 may include a chamber 412 having an opening 413. The shield 400 may further include a multi-stage cooling device 420 including a first stage 421 and a second stage 422, the second stage 422 having an opening or void 423 configured to enable to place at least a portion of the detector 110 to thermal communication with the first stage 421 but in isolation from the second stage 422 and the chamber 412, which may contact the second stage 422. In such an embodiment, the cooling device 420 may be configured such that the detector 110 lies on a different plane than the chamber 412, as shown in FIG. 4. The opening 413 enables contact and direct thermal communication between the chamber 412 and a cooler stage of the multi-stage cooling device 420, thereby enabling the chamber 421 to be cooled to a lower temperature than the detector 110.

As shown in FIG. 4, the chamber 412 may be in direct thermal communication with the second stage 422, which may be cooler than the first stage 421. In such an embodiment, the cooling device 420 may cool the detector 110 to an intermediate temperature below the ambient or surroundings temperature, driven substantially by the first stage 421, and the cooling device 420 may further cool the chamber 412 to a target temperature that is lower than the intermediate temperature, driven substantially by the second stage 422. In certain embodiments, the first stage 421 may be an intermediate stage and the second stage 422 may be a final stage of a multi-stage cooler having more than two stages.

The cooling device 420 with the opening or void 423 and chamber 412 with the opening 413 provides an efficient and effective thermal interface to the second stage 422 of the multi-stage cooling device 420, which enables the shield 400 to operate at a desired temperature that is lower than the desired operating temperature of the detector 110. In doing so, potentially interfering radiation emitted by the chamber 412 is reduced, improving the signal to noise ratio of the detector 110. With the multi-stage cooling device 420, there may be a point of diminishing returns at some shield temperature, below which thermal radiation from shield 400 is no longer significant with respect to the inherent dark current of the detector 110.

While various embodiments of a radiation shield for a NIR detector have been described in considerable detail herein, the embodiments are merely offered by way of non-limiting examples of the disclosure described herein. It will therefore be understood that various changes and modifications may be made, and equivalents may be substituted for elements and steps thereof, without departing from the scope of the disclosure. Indeed, this disclosure is not intended to be exhaustive or to limit the scope of the subject matter disclosed.

The invention claimed is:

1. A Raman spectroscopic system, comprising:
a spectrograph configured to generate Raman spectra in a desired wavelength range, the spectrograph including an optic adapted to transmit the Raman spectra within a solid angle, the solid angle including a Raman signal;
a near-infrared detector configured to receive the Raman signal and output electrical signals representative of the Raman spectra within a spatial range, wherein the detector is further configured to operate in a wavelength range of about 1.0 to 2.5 microns,
wherein the detector is enclosed in a radiation shield, the shield including a chamber composed of a thermally conductive material and including an opening in opposing relation to the detector, wherein the opening is sized relative to a distance from the detector to the optic of the spectrograph such that only the solid angle containing the Raman signal is incident upon the detector, enabling the detector to receive the Raman spectra from the spectrograph through the opening; and
a multi-stage cooling device in thermal contact with the chamber and the detector, the cooling device including a first stage in direct thermal contact with the chamber and a second stage in direct thermal contact with the detector, wherein the cooling device is operative to maintain the chamber at a chamber temperature and the detector at a detector temperature, the chamber temperature different than the detector temperature, to reduce thermal noise emitted by the chamber and incident upon the detector such that the thermal noise is not significant relative to an inherent dark current of the detector or the Raman signal, thereby improving the signal to noise ratio of the detector.

2. The spectroscopic system of claim 1, wherein in the desired wavelength range is 1.0 to 2.5 microns, and the electromagnetic signals are Raman signals.

3. The spectroscopic system of claim 1, the chamber is composed of an allotrope of carbon, the chamber including a wall having a thickness that transitions from a monocrystalline or polycrystalline allotrope of carbon at an exterior surface of the wall to an array of columns or spires at an interior surface of the wall, wherein the columns or spires are proportioned and distributed to maximize absorption of radiation in an operational wavelength range of the detector.

4. The spectroscopic system of claim 1, wherein the chamber has an interior surface with a surface treatment having an absorptivity greater than 0.5, 0.7 or 0.9 in an operational wavelength range.

5. The spectroscopic system of claim 1, wherein the chamber has an exterior surface with an emissivity less than 0.2 and/or a reflectivity greater than 0.8 in the infrared range.

6. The spectroscopic system of claim 5, wherein the exterior surface includes a surface treatment.

7. The spectroscopic system of claim 1, wherein the detector is an Indium-Gallium-Arsenide, Indium-Arsenide, Silicon, Germanium, Silicon-Germanium, Lead-Sulfide, Lead-Selenide or Mercury-Cadmium-Telluride detector.

8. The spectroscopic system of claim 1, wherein the detector is a multi-element detector.

9. The spectroscopic system of claim 1, wherein the cooling device is a solid-state, thermoelectric cooler.

10. The spectroscopic system of claim 1, the system further comprising a window covering the opening in the chamber, wherein the window is constructed of glass, glass-ceramic, diamond, transparent ceramic, crystalline quartz, silicon, germanium, gallium nitride crystals, aluminum nitride crystals, optical metamaterial, sapphire or a combination thereof.

11. The spectroscopic system of claim 10, wherein the window includes one or more coatings to pass the desired wavelength range of interest and/or block radiation at wavelengths outside the desired wavelength range of interest.

12. The spectroscopic system of claim 1, wherein the chamber is disposed within an evacuated dewar including a dewar window in optical alignment with the opening and the detector.

13. The spectroscopic system of claim 12, wherein the dewar window includes one or more coatings to pass the desired wavelength range or block radiation at wavelengths outside the desired wavelength range.

14. The spectroscopic system of claim 1, wherein the chamber is composed of metal, metal alloy, non-metal, ceramic, glass, mono-crystalline material, poly-crystalline material and/or composite material.

15. The spectroscopic system of claim 14, wherein the chamber material has a thermal conductivity greater than 100 Watts per meter-Kelvin.

16. The spectroscopic system of claim 1, wherein the chamber has an interior surface with an emissivity less than 0.1, 0.3 or 0.5 and an exterior surface with a reflectivity greater than 0.5, 0.7 or 0.9.

17. The spectroscopic system of claim 16, wherein the interior surface includes a surface treatment.

18. The spectroscopic system of claim 1, wherein the detector temperature is lower than the chamber temperature.

19. The spectroscopic system of claim 1, wherein the chamber temperature is lower than the detector temperature.

20. The spectroscopic system of claim 1, wherein the cooling device is a cyclic compression-expansion cooler.

21. A radiation shield for a near-infrared detector, comprising:
a chamber including an aperture and a near-infrared detector having at least one detector element, the chamber composed of a thermally conductive material, the detector disposed within the chamber and opposite the aperture; and
a cooling device in thermal contact with the chamber and structured to lower the temperature of the chamber to reduce the emission from the chamber of unwanted radiation incident upon the detector, wherein the aperture is configured to enable the detector to receive electromagnetic signals in a desired operational wavelength range from a spectrograph,
wherein the chamber is composed of an allotrope of carbon, the chamber including a wall having a thickness that transitions from a monocrystalline or polycrystalline allotrope of carbon at an exterior surface of the wall to an array of columns or spires at an interior surface of the wall, wherein the columns or spires are proportioned and distributed to maximize absorption of radiation in an operational wavelength range of the detector.

* * * * *